May 24, 1960  S. ENGELSTEIN  2,937,483
AUTOMATIC MICRO-JACKET FILM INSERTER
Filed Aug. 28, 1958  2 Sheets-Sheet 1

INVENTOR.
STANLEY ENGELSTEIN
BY Kenyon and Kenyon
ATTORNEYS

May 24, 1960 S. ENGELSTEIN 2,937,483
AUTOMATIC MICRO-JACKET FILM INSERTER
Filed Aug. 28, 1958 2 Sheets-Sheet 2
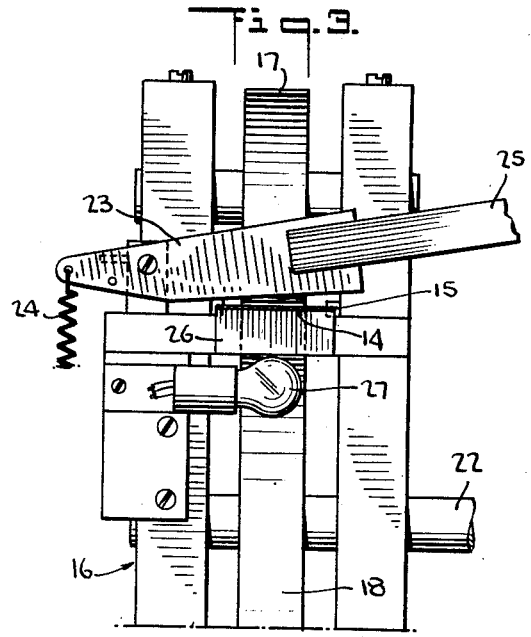
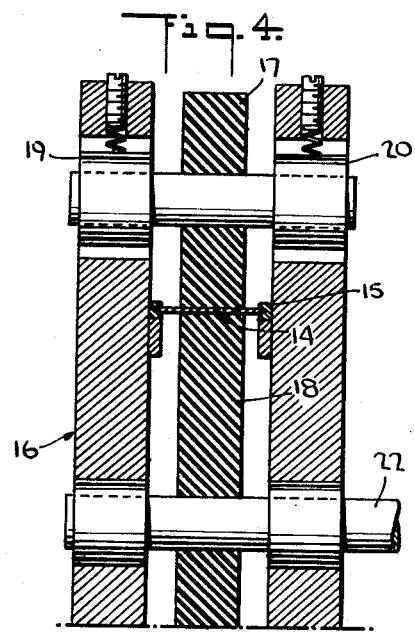
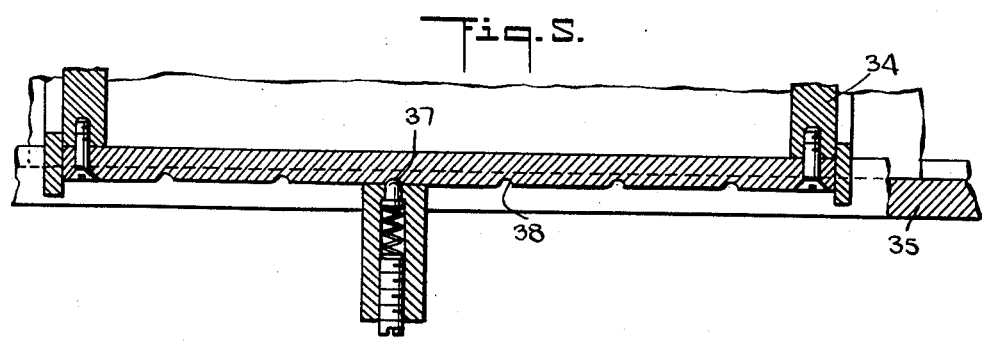
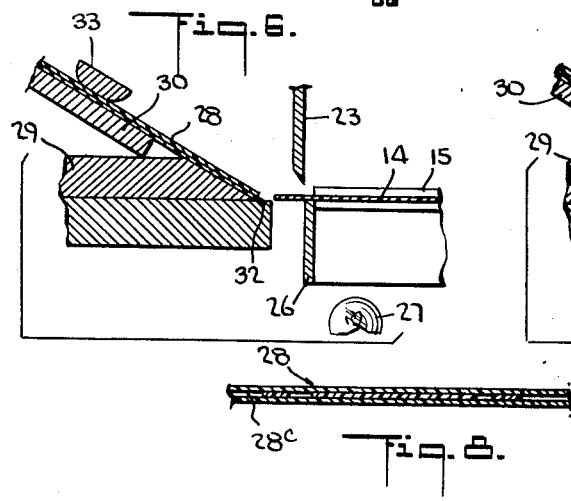
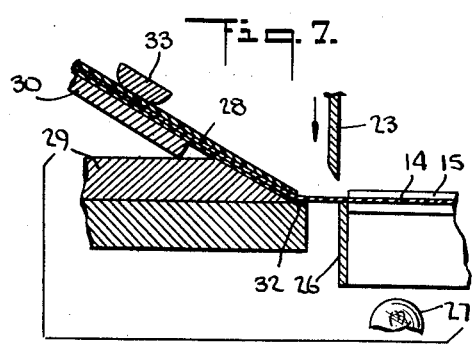
INVENTOR.
STANLEY ENGELSTEIN
BY Kenyon and Kenyon
ATTORNEYS

United States Patent Office 2,937,483
Patented May 24, 1960

2,937,483

AUTOMATIC MICRO-JACKET FILM INSERTER

Stanley Engelstein, Roslyn Heights, N.Y., assignor to Enbee Transparent Specialty Company, Inc., Long Island City, N.Y., a corporation of New York Filed Aug. 28, 1958, Ser. No. 757,730

8 Claims. (Cl. 53—123)

This invention pertains to apparatus for feeding film into protective jackets and more particularly to a mechanism adapted to section a roll of microfilm into strips and to insert the strips into the chambers of a transparent micro-jacket.

For ease of transmission and storage, it is known to photograph records, documents and other forms of information in a reduced scale on microfilm, each photograph appearing on a distinct frame along the film roll. The microfilm is capable of re-enlargement or reading by suitable optical devices. By such means the amount of space occupied by records may be considerably reduced and the preservation of valuble documents ensured.

When in roll form, ready access cannot be had to specific microfilm frames and for this reason it is sometimes necessary to divide the roll into strips, each having a like number of frames. These strips are inserted in so-called micro-jackets which take the form of a transparent envelope provided wtih several parallel channels or pockets for accommodating individual strips. The micro-jackets may be indexed and stored in suitable files so that when there is a call for a particular record the appropriate micro-jacket may be quickly selected and placed in a reader for optical projection and viewing.

The sectioning of a microfilm roll into strips and their insertion into micro-jackets has heretofore been carried out by hand. This is a time-consuming and costly procedure with many areas of error due to the excessive manual handling of the film strip. Because of dimensional variations which are found in individual micro-jackets, different manual techniques are involved in the course of inserting operations.

For example, where the chamber of a micro-jacket is very tight, it becomes necessary for the operator to pick up the film strip, insert it between the jaws of a specially designed tool, lead the strip into the chamber with the other end of the tool and then pull it into position. Thus in order to insert a single strip into a tight chamber, there is involved the three successive manual steps of attaching the film strip to the tool, inserting the tool into the jacket and pushing the tool through the chamber to draw the film into place.

On the other hand, where the chamber of the micro-jacket is more free, one can dispense with the tool but the operator must nevertheless cut the film strip, pick up the strip in his fingers, locate the entrance to the chamber and by a number of finger thrusts, depending on the length of film and the resistance encountered, urge the film into position.

Conventional manual techniques for film insertion are clearly not commercially feasible where microfilm records in the order of millions of strips must be fed into jackets. Moreover, the fingering of the transparencies by human operators results in smudging of the film surface and impairs the quality of reproduction.

In view of the foregoing, it is the primary object of this invention to provide a film-feeding mechanism for sectioning a roll of microfilm into strips and for inserting each strip into a selected chamber of a transparent micro-jacket. A significant advantage of the invention resides in the fact that the film is never touched by human hands and the quality of the film is maintained.

More specifically, it is an object of the invention to provide a machine adapted to feed a film into a micro-jacket having a chamber whose end is cut back to form a tracking ledge, the ledge acting to guide an incoming film strip into the chamber. An important advantage of the invention is that ordinary dimensional variations in the channel depth do not obstruct the normal insertion of the film strip.

Also an object of the invention is to provide a film-feeding mechanism of simple and efficient design which operates to cut and insert film strips at a rapid rate into the chambers of a micro-jacket, whereby large-scale film-loading operations may be carried out at low cost.

Briefly stated, the objects are attained in a mechanism comprising track means to advance a continuous film along a predetermined path, the micro-jacket being supported in a loading platform which is laterally shiftable relative to said path to present a selected channel opening to the leading edge of the film, a slicer being interposed between the platform and the track means to section the film to the desired strip size subsequent to the insertion thereof in the channel.

For a better understanding of the invention as well as other objects and further features of the invention, reference is made to the following detailed specification to be read in connection with the accompanying drawings, wherein like components in the several figures are designated by like reference numerals.

In the drawings:

Fig. 3 is a view taken along the plane indicated by line 3—3 in Fig. 1.

Fig. 4 is a vertical section taken along the plane of the line 4—4 in Fig. 1.

Fig. 5 is a horizontal section taken in the plane indicated by line 5—5 in Fig. 4.

Fig. 6 is an enlarged view of a portion of Fig. 1 showing the leading edge of film as it is fed into a jacket chamber.

Fig. 7 shows the film subsequent to insertion in the chamber and prior to cutting to strip size.

Fig. 8 is a sectional view taken in the plane indicated by lines 8—8 in Fig. 2.

Figure 1:
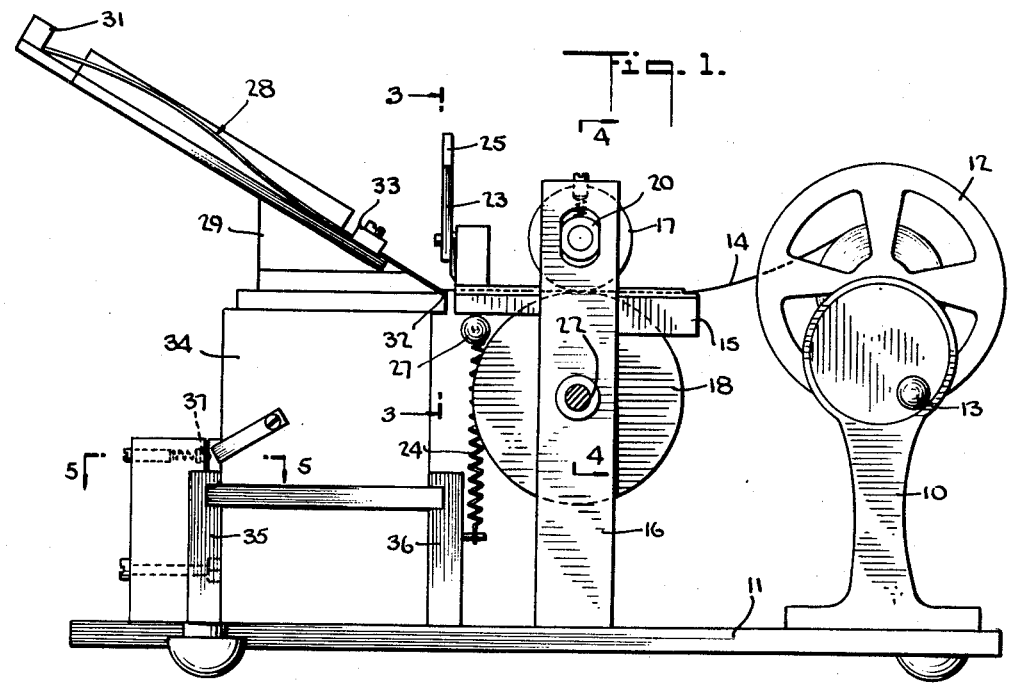
Fig. 1 is a front elevational view of the machine in accordance with the invention.
Figure 2:
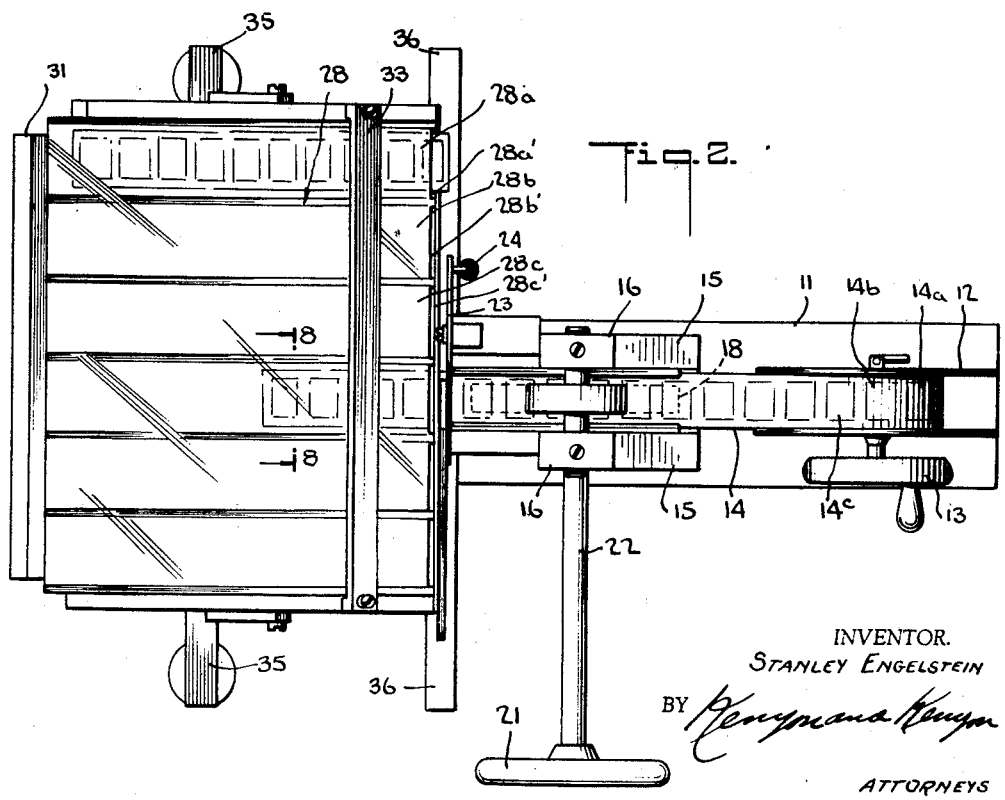
Fig. 2 is a plan view of the machine.

Referring now to the drawings and more particularly to Figs. 1 and 2, the film-feeding mechanism comprises a vertical film-dispensing stand 10, fixedly mounted on a horizontal bed 11, a microfilm reel 12 being rotatably supported on the stand. A roll of microfilm may be wound onto the reel by means of a crank 13.

A continuous web of film 14, drawn from the reel, is led through a horizontal guide track 15 mounted on a vertical standard 16 supported above bed 11, the film passing through feed rollers 17 and 18. The upper roller 17 is journaled in spring-biased bearings 19 and 20 and is urged against the lower roller 18, the film being compressed therebetween for positive drive action. Forward movement of the film is effected by a manual wheel 21 secured to the shaft 22 of the lower roller. Thus as wheel 21 is turned in the clockwise direction, the film is advanced toward the left along a predetermined path.

Film 14, as best seen in Fig. 2, carries a continuous series of picture frames 14a, 14b, 14c, etc. Mounted at the front end of the film track 15 is a spring-loaded film slicer including a pivoted blade 23, one end of which is connected to a helical spring 24 which normally raises the blade to an inoperative position. The blade is brought down by a handle 25, the blade acting against an anvil 26. Mounted below the blade and under the film is an electric lamp 27 which illuminates the film and facilitates inspection.

The empty micro-jacket, generally designated by numeral 28, is supported on a loading platform 29 to which is attached at an inclined position a rectangular plate 30 dimensioned to accommodate the micro-jacket. Micro-jacket 28 is preferably of the type disclosed in the copending application Serial No. 748,967, filed July 16, 1958, entitled "Micro-Jacket," and is constituted by two superposed transparent panels joined together by spaced ribs to define parallel channels 28a, 28b, 28c, etc. The edge of the upper panel is cut back to form projecting ledges 28a', 28b' and 28c'.

A backstop 31 is affixed to the upper end of plate 30 to anchor the jacket firmly, the lower end of the jacket being received within a trench 32. Mounted transversely across the plate 28 adjacent the lower end thereof is a bridge piece 33. The distance between the backstop 31 and the trench 32 is slightly shorter than the length of the micro-jacket, whereby the jacket is caused to buckle between the bridgepiece and the backstop, as best seen in Fig. 1. This buckling action tends to lock the jacket into place during the loading operation without the use of clamps or other means which would interfere with film insertion. It also facilitates rapid removal of the loaded jacket. The input end of the jacket lies flat against the inclined platform.

The loading platform is mounted on a slidable pedestal 34 which may be shifted in the horizontal plane along rails 35 and 36 to register any of the micro-jacket channels with the incoming film. A detent device is provided to hold the pedestal in any selected loading position, the device comprising a spring-loaded detent finger 37 which cooperates with a slat 38 having spaced recesses therein to receive the finger.

In operation, the film is transported by the feed rollers 17 and 18 toward the ledge of the selected jacket channel in registration therewith. The ledge is inclined relative to the leading edge of the film and since the film is confined by the track 15, the continued forward motion thereof causes the film to strike the approximate center of the ledge. The film is deflected upwardly by the ledge into the channel. When the film is driven fully into the channel (note channel 28a in Fig. 2), the slicer is activated to shear the film. The pedestal is then indexed to a new position for the next loading operation.

It is to be noted that after the jacket channel is loaded with a film strip, a small end portion of the strip will extend beyond the edge of the channel if the sectioning knife is slightly spaced therefrom. This end portion may easily be pushed into the jacket by tapping the jacket on the top or pushing it against a straight edge. Preferably, the knife position is arranged exactly to abut the jacket edge to cut flush and obviate any overhang of the strip requiring further manipulation.

The manually-operated machine disclosed herein is illustrative of the principles of operation of the invention in its most elementary form. It is to be understood, however, that the machine operation may be rendered cyclical and completely automatic by a periodically-actuated motor drive for the feed rollers (as by a single cycle clutch), the drive being coordinated with a reciprocating device for the film slicer and an indexing or stepping device for shifting the jacket pedestal, such that after each step of the pedestal the rollers are caused to feed a predetermined length of film into the selected channel and the knife is then brought down to complete the cycle.

To avoid the need for visual adjustment and to ensure proper cyclical operation, trigger dots may be placed on the film at the desired strip terminal positions, which dots can be sensed by a photocell whose output serves to initiate a cyclical operation.

If the tolerances of the machine are carefully maintained, it is also possible to feed the film into packets without channel ledges, in which event the jacket would be held in the same horizontal plane as the incoming film.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. In a film-feeding mechanism for inserting strips of film into the respective channels of a jacket, the ends of the channels having projecting ledges, means to feed a continuous web of film along a predetermined path, and an inclined loading platform for supporting said jacket and to present the channel openings thereof to the leading edge of said film whereby the leading edge engages the projecting ledge so as to deflect the film into said channel, said platform being laterally shiftable relative to said feed means for selectively aligning said openings with said path whereby said film may be led into a desired channel.

2. A film-feeding mechanism for inserting strips of film into the respective channels of a micro-jacket, the ends of the channels having projecting ledges, comprising track means to feed a continuous web of film along a predetermined path, an inclined loading platform for supporting said jacket and to present the channel openings thereof to the leading edge of said film whereby the leading edge engages the projecting ledge so as to deflect the film into said channel, said platform being shiftable laterally relative to said track means for selectively aligning said openings with said path, whereby said film may be led into a desired channel, and means interposed between said track means and said platform to cut said film subsequent to insertion thereof.

3. A film-feeding mechanism for sectioning a roll of microfilm into strips and for inserting the strips into the respective channels of a transparent micro-jacket, the ends of the channels having projecting ledges, comprising a film roll support, track means including pressure rollers to feed a continuous web drawn from said roll along a predetermined path, an upwardly inclined loading platform for supporting said jacket and to present the channel openings thereof to the leading edge of said film whereby the leading edge engages the projecting ledge so as to deflect the film into said channel, means mounting said platform for shifting movement relative to said track means for selectively aligning said openings with said path whereby said film may be led into a desired channel, and means interposed between said track means and said platform to cut said film subsequent to insertion.

4. A film-feeding mechanism for inserting strips of microfilm into the respective channels of a transparent micro-jacket, the ends of the channels having projecting ledges, a reel for supporting a roll of film, track means aligned with said reel and including pressure rollers to draw a web of film from said reel and to advance said web along a predetermined path, an upwardly inclined loading platform for supporting said jacket and to present the channel openings thereof to the leading edge of the film directed by said track means whereby the leading edge of the film so engages the projecting ledge as to be deflected into the channel, means mounting said platform for shifting movement laterally relative to said track means for selectively aligning said channel openings with said path whereby said film may be led into a desired channel, and shear means interposed between said track means and said platform to cut said film into strips of the desired length.

5. A film-feeding mechanism for inserting strips of film into the respective channels of a multiple-channel micro-jacket, the ends of the channels having projecting ledges, a reel for supporting a roll of film, track means including pressure rollers to draw a film web from said reel and to advance said web along a predetermined horizontal path, an upwardly inclined loading platform for supporting said jacket and to present the channel openings thereof to the leading edge of the film fed by said track means whereby said leading edge engages the inclined ledge at the channel opening so as to be deflected into said channel, means mounting said platform for shifting movement laterally relative to said track means for selectively aligning said openings with said path whereby said film may be led into a desired channel, and shear means interposed between said track means and said platform to cut said film into strips of the desired length.

6. In a film-feeding mechanism for inserting film into micro-jackets whose channels are provided with projecting ledges, a platform to support a micro-jacket at an upwardly inclined position, and means to feed film toward said jacket to cause the leading edge thereof to strike the inclined ledge of a channel opening so as to be deflected into said channel, whereby further advance of said film effects insertion thereof in said channel.

7. A film-feeding mechanism for inserting strips of film into the respective channels of a multiple-channel micro-jacket, the ends of the channels having projecting ledges, a reel for supporting a roll of film, track means including pressure rollers to draw a film web from said reel and to advance said web along a predetermined horizontal path, an upwardly inclined loading platform for supporting said jacket and to present the channel openings thereof to the leading edge of the film fed by said track means, a sliding pedestal mounting said platform for shifting movement laterally relative to said track means for selectively aligning said openings with said path whereby the leading edge of said film is engageable with said ledge and may be led into a desired channel, and shear means interposed between said track means and said platform to cut said film into strips of the desired length.

8. A mechanism as set forth in claim 7, wherein said platform includes a backstop for anchoring one end of the micro-jacket, a trench for receiving the other end of the jacket and for exposing the ledges of the channel to the advancing film, and a bridgepiece supported at a position intermediate the backstop and the trench, the distance between said backstop and said trench being such as to cause buckling of the micro-jacket between the bridgepiece and backstop.

References Cited in the file of this patent

UNITED STATES PATENTS

| | | |
|---|---|---|
| 1,505,404 | Mitchell | Aug. 19, 1924 |
| 1,573,120 | Penley | Feb. 16, 1926 |
| 1,792,856 | Meiselbach | Feb. 17, 1931 |
| 2,752,743 | Friedli | July 3, 1956 |